Patented Mar. 15, 1938

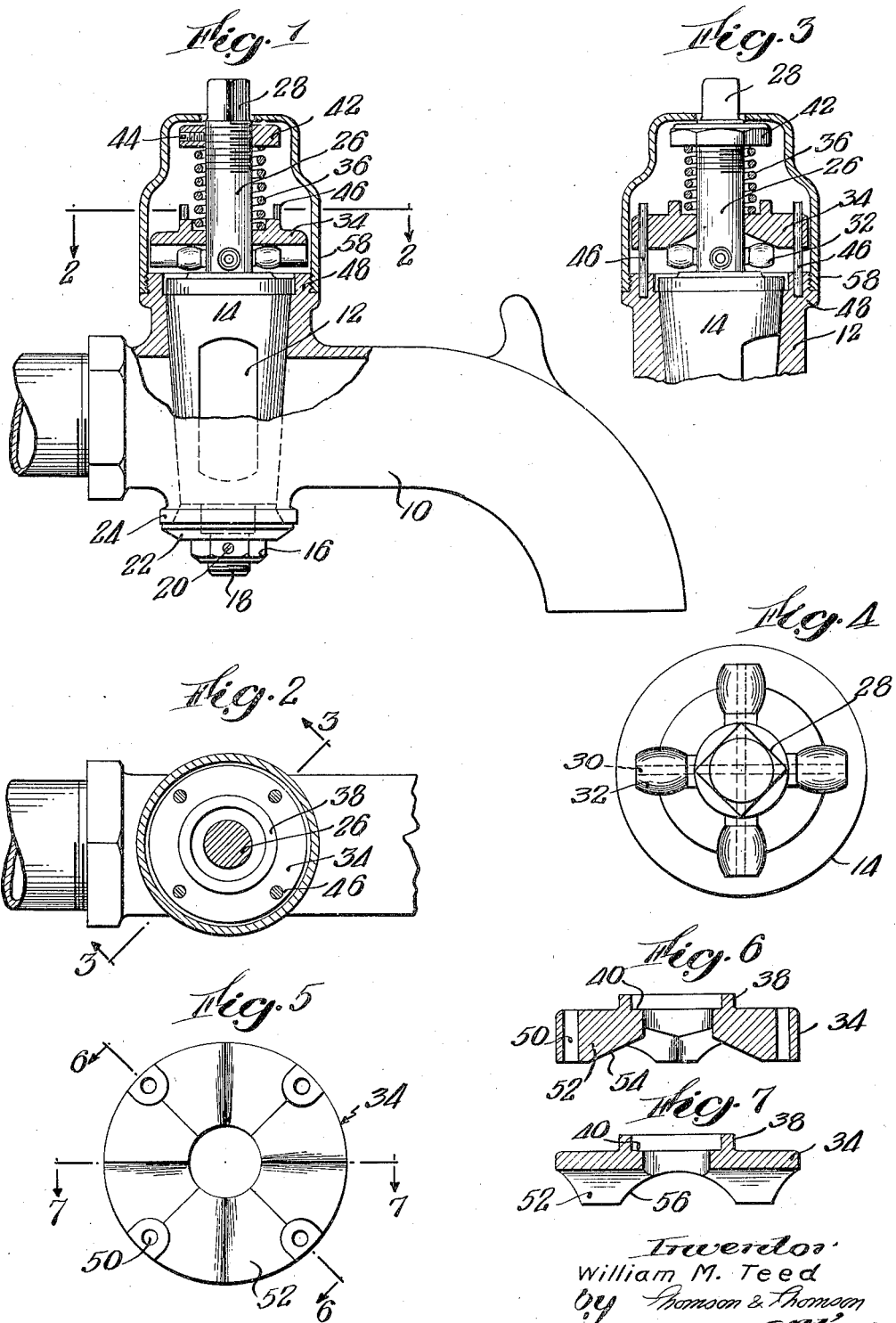

2,110,924

UNITED STATES PATENT OFFICE 2,110,924

VALVE

William M. Teed, Boston, Mass.

Application October 17, 1936, Serial No. 106,135

2 Claims. (Cl. 251—149)

This invention relates to improvements in valve construction and more particularly to improvements in the operating means for valves of the type used in dispensing nozzles of gasoline trucks.

It is common practice to employ a dispensing nozzle controlled by a conical valve having a valve stem which is turned by a lever in setting the valve for open and closed positions. Often times the operator fails to turn the valve fully to its closed position and leakage occurs.

It is an object of my invention to provide a construction which will enable accurate setting of the valve and which will prevent the valve being left in any position other than a predetermined position.

It is further an object of my invention to provide means associated with the valve stem intermediate the valve and the point at which the operating lever is applied, which will be effective to turn and move the valve towards one of a plurality of predetermined positions when it is manually operated.

It is a still further object of my invention to provide a plurality of radial arms on the valve stem carrying rollers which are engaged by a displaceable cam plate which is forced against the arms of the stem by a stiff spring the tension of which can be suitably adjusted.

Further objects and advantages of my improvements will be more readily apparent from the following description of a preferred embodiment thereof as disclosed in the accompanying drawing in which:

Fig. 1 is a side elevation of the valve partially shown in vertical section;

Fig. 2 is a cross section taken on the plane indicated 2—2 in Fig. 1;

Fig. 3 is a vertical section taken on the plane indicated 3—3 in Fig. 2;

Fig. 4 is a plan view of the valve stem and radial arms;

Fig. 5 is a detail bottom view of the cam plate;

Fig. 6 is a sectional view of the cam plate taken on the plane indicated 6—6 in Fig. 5; and Fig. 7 is a further sectional view of the cam plate taken on the plane indicated 7—7 in Fig. 5.

The nozzle 10 in Fig. 1 is provided with a tapered valve 12 having a valve port 14. The valve is maintained tight on its seat by the nut 16 which is fixed in adjusted position on the threaded stud 18 by a set screw 20. The nut 16 bears on a washer 22 which abuts against a shoulder 24 of the nozzle.

The valve has a stem 26 formed at its upper end with a squared portion 28 adapted to be engaged by a lever for turning the valve. A plurality of radial arms 30 are provided on the valve stem which carry rollers 32. A vertically displaceable cam plate 34 fits over the valve stem and is urged into engagement with the rollers by a spring 36, the lower end of which fits within an annular flange 38 on the cam plate and seats on the shoulder 40. The upper end of the spring abuts against a washer 42 which is threaded to the valve stem and is retained in adjusted position by a set screw 44.

The cam plate is held against rotation by a plurality of guide posts 46 which are mounted in a shoulder 48 of the valve casing and are received in openings 50 of the cam plate. The cam plate has a plurality of radially disposed cam portions 52 each of which has its radial center line 54 at an angle to the horizontal and the sides of which are smoothly rounded as at 56 to form a track for the rollers 32. The cam plate, spring and adjusting nut are enclosed within a cover 58 which is threaded to the shoulder 48.

As shown the rollers and the cams are so disposed that the valve will be normally retained in a position either full open or full closed as each ninety degree turn will bring the rollers to the bottom of the spaces between the cam projections. The mechanism provided will automatically complete the movement of the valve and it is not necessary for the operator to use great care in setting the valve.

The cam and spring will also serve as locking means for the valve and prevent accidental displacement of the valve from closed position due to jars received while the gasoline truck is in transit. Furthermore, due to the considerable resisting force holding the valve in closed position the valve will not be disturbed by children playing around the truck.

I claim:

1. A valve comprising a valve casing, a valve member therein, means for preventing axial displacement of the valve member with respect to its seat, a manually operable valve stem, a cam member axially displaceable with respect to the valve stem, means for preventing rotation of the cam member with respect to the valve casing, a cam follower on the valve stem, and a spring coaxially disposed with respect to the valve stem and urging said cam into engagement with said cam follower.

2. A valve comprising a valve casing having a valve seat, a rotatable valve member cooperating with said valve seat, a manually rotatable valve stem extending from said valve member, a ring-shaped face cam member loosely fitting the valve stem, posts fixed to the valve casing and received by said cam member to prevent rotation thereof, a spring abutting against said cam member at one end, an adjustable abutment on said valve stem for the other end of said spring, a plurality of radial arms on said valve stem and rollers on said arms adapted to engage the cam face of the cam member, said cam face being formed to bring said valve member to rest at predetermined ninety degree positions whereby the valve is either fully open or fully closed when at rest.

WILLIAM M. TEED.